United States Patent

[11] 3,569,690

| [72] | Inventor | Donald A. Nelson<br>Ventura, Calif. |
|---|---|---|
| [21] | Appl. No. | 753,039 |
| [22] | Filed | Aug. 15, 1968 |
| [45] | Patented | Mar. 9, 1971 |
| [73] | Assignee | the United States of America as represented by the Secretary of the Navy |

[54] CLUSTER LIGHT SUPPORT AND CONTROL MECHANISM
3 Claims, 5 Drawing Figs.

[52] U.S. Cl......................................................... 240/7.7,
240/57, 240/61
[51] Int. Cl....................................................... B64d 47/02
[50] Field of Search............................................ 240/1.2,
1.4, 41.37, 41.6, 44, 57, 44.2, 52, 61, 61.05, 61.11,
7.7

[56] References Cited
UNITED STATES PATENTS

| 1,335,832 | 4/1920 | Harvey | 240/1.4X |
|---|---|---|---|
| 1,429,443 | 9/1922 | Mc Faddin | 240/1.4X |
| 1,596,370 | 8/1926 | Nirdlinger | 240/1.4 |
| 1,663,656 | 3/1928 | Guth | 240/1.4 |
| 1,909,947 | 5/1933 | Greppin | 240/1.4 |
| 1,941,503 | 1/1934 | Villiers | 240/1.2 |
| 2,069,950 | 2/1937 | Greppin | 240/1.4 |
| 2,574,211 | 11/1951 | Hill | 240/52X |
| 2,758,196 | 8/1956 | Greppin | 240/41.6X |
| 3,005,087 | 10/1961 | Klein | 240/41.6X |
| 3,155,322 | 11/1964 | Akita et al. | 240/3 |

Primary Examiner—John M. Horan
Assistant Examiner—Alan Mathews
Attorneys—Q. Baxter Warner and Edgar J. Brower ABSTRACT: A number of light units are arranged in a cluster on a common support. Means is provided for tilting and aiming the cluster. The alignment of the light units relative to each other can be varied so as to create either converging or diverging beams.

INVENTOR.
DONALD A. NELSON

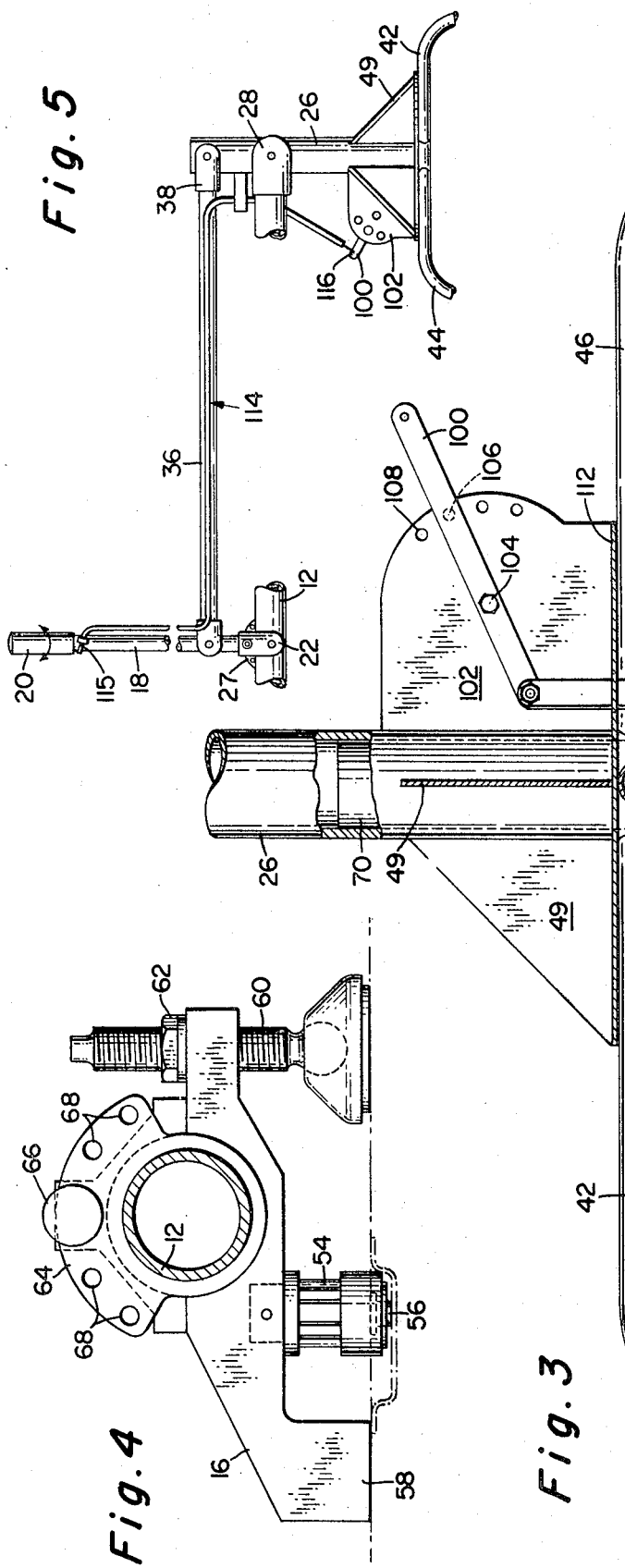

3,569,690

CLUSTER LIGHT SUPPORT AND CONTROL MECHANISM

BACKGROUND OF THE INVENTION

1. Field of the Invention

Support and adjustment means for illumination devices and particularly for a cluster of several light units mounted for movement together. Of particular interest are adjustable high-intensity airborne floodlights.

2. Prior Art

Heretofore searchlight mounts, operating room light fixtures and theater spotlights have been provided with support and adjustment means so that the light beam can be directed in various ways and the scope of illumination can be changed. Such devices, however, are not readily adapted to a cluster of illuminating devices, especially devices which are mobile in nature and may require continual manipulation in order to meet constantly changing illumination needs.

SUMMARY

A support and control means for a plurality of clustered light units is provided with a cantilever-type mount incorporating controls for ready manipulation in order to change the direction of the composite light beams and the convergence or divergency of the separate beams of the light units.

Other objects, advantages, and novel features of the invention will become apparent from the following detailed description of the invention when considered in conjunction with the accompanying drawings.

BRIEF DESCRIPTION OF THE DRAWINGS

FIG. 3 is an enlarged detail view partially in section of the light cluster assembly taken along a line substantially corresponding to line 3—3 of FIG. 2.

FIG. 4 is a greatly enlarged cross-sectional view of a cantilever arm supporting journal block and latch taken along a line substantially corresponding to the line 4—4 of FIG. 1.

FIG. 5 is a fragmentary representation of a modification wherein the convergence-divergence control is combined with the arm movement operating handle.

DESCRIPTION OF THE PREFERRED EMBODIMENT

Figure 1:
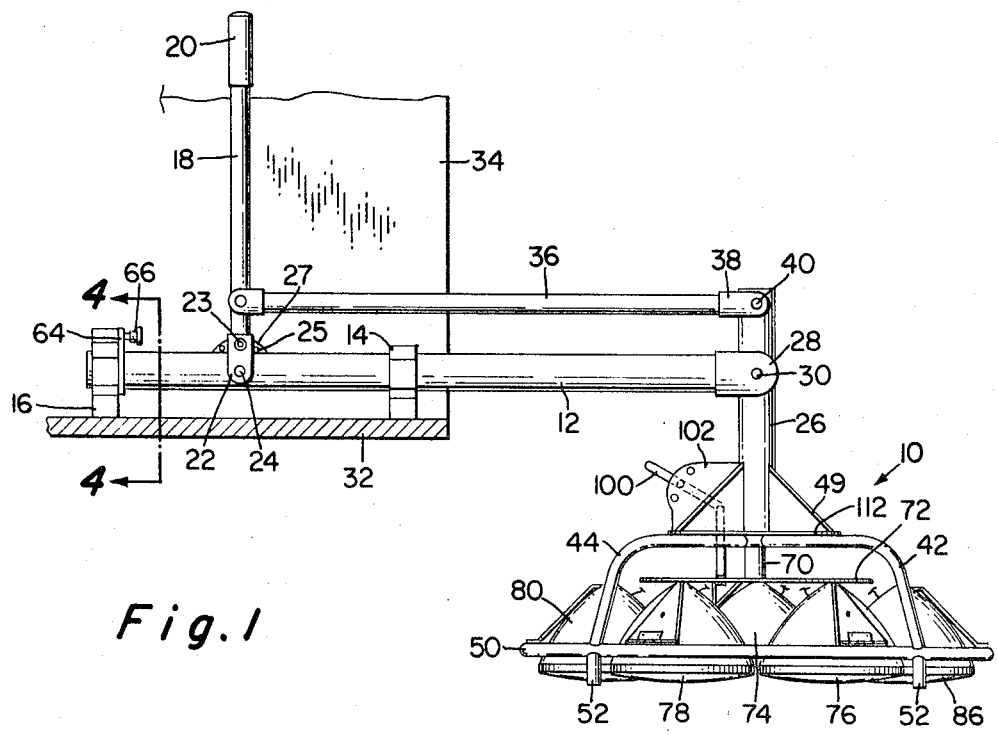
FIG. 1 is a vertical side elevational view of one embodiment of the present invention shown mounted upon and extending from a support platform such as a helicopter floor.
Figure 2:
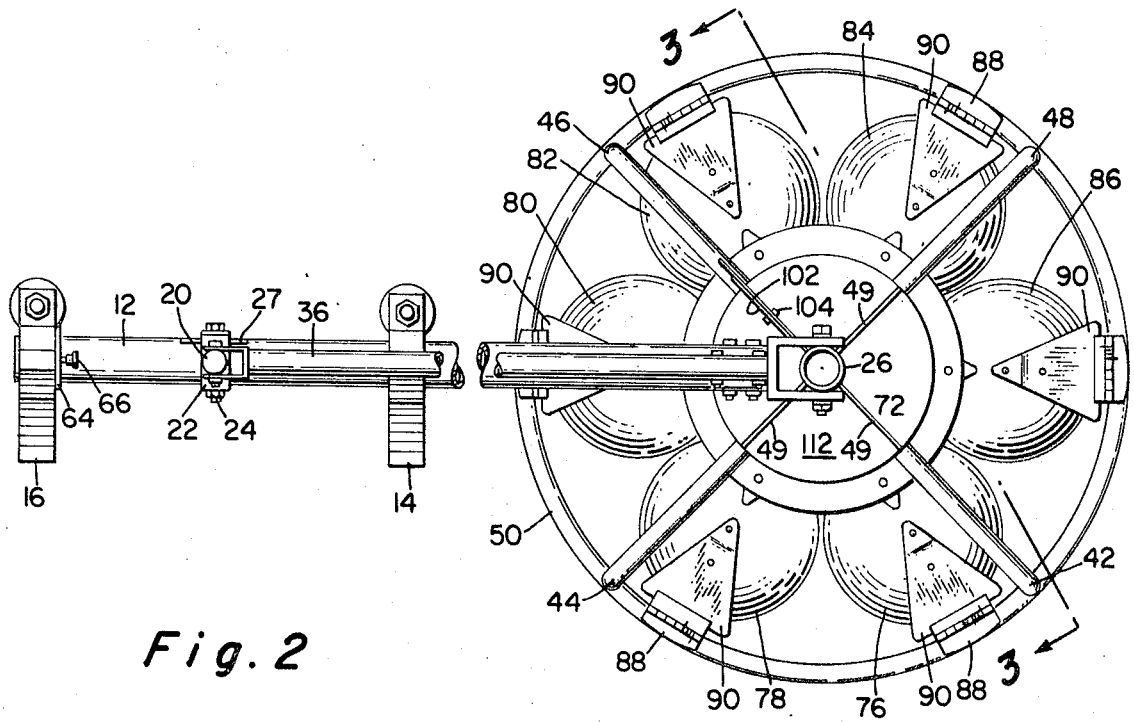
FIG. 2 is a top plan view slightly enlarged of the embodiment illustrated in FIG. 1.

Referring now to the drawings in detail, one embodiment of the invention is illustrated as supported upon the floor of a helicopter and extending through the open door thereof. With such an arrangement the operator is positioned above the assembly and, from that vantage point, manipulates the lights in accordance with need. The invention is particularly adapted for use by helicopters on assault missions or rescue missions, especially where it is desired quickly to approach an enemy-held area, illuminate the area with a broad beam in order to locate a target and then zero in on the target with a pinpoint of intense illumination, all while forward, lateral and vertical movements of the helicopter are in progress progress.

Referring now to the drawings in detail. FIG. 1 shows a cluster assembly 10 which is supported at the outboard end of a cantilever beam arm 12 journaled for rotary movement about its longitudinal axis in spaced journal blocks 14 and 16.

An upright control handle 18 having a hand grip portion 20 at its upper end is mounted upon arm 12 by a clevis fitting 22 having a pivot pin 24 extending transversely through arm 12. To lock the handle upright or in a fixed tilted alignment with beam arm 12 a detent pin 23 may be inserted in one of the arcuately spaced openings 25 in an index plate 27.

With the above arrangement it will be apparent that sidewise movement of handle 18 will rotate cantilever arm 12 about its longitudinal axis. Light cluster 10 depends from an upright tubular stem 26 at the outer end of the cantilever arm 12 about its longitudinal axis. Light cluster 10 depends from an upright tubular stem 26 at the outer end of the cantilever beam arm 12 to which it is connected by clevis 28 and pin 30. The aforementioned rotary movement of arm 12 swings the cluster assembly about the longitudinal axis of cantilever arm 12 and in a plane parallel to the forward and aft axis of the helicopter. Thus when the assembly is mounted on the floor 32 of a helicopter so that the arm 12 extends laterally through the open helicopter side door 34 such movement will then cause the cluster of lights to swing toward the front or the rear of the helicopter.

Lateral movement of the light cluster in a plane extending toward and away from the side of the helicopter and at 90° from the forward and aft plane just described may be provided by right and left movement of the handle 18 about clevis pin 24. This pushes and pulls link rod 36 which has a clevis 38 at its outer end to provide pivotal connection through pin 40 with the upper end of upright cluster supporting stem 26. Such movement swings the cluster assembly about pivot pin 30 to cause lateral movement of the cluster toward and away from the helicopter body.

In the embodiment illustrated the cluster assembly 10 is shown formed of a lightweight open tubular light protective framework made up of four radially directed arms 42, 44, 46 and 48 which are welded at their inner ends to the lower end of upright stem 26 where they are reinforced by triangular braces 49 connecting each arm to stem 26. At their downturned outer ends these radiating arms are interconnected by a tubular ring 50. Short extensions 52 may be spaced around the ring 50 to form feet upon which the cluster assembly may rest when detached from its support.

The journals 14 and 16 are similar in construction. Journal 16 is shown in detail in FIG. 4. Each journal has a holddown means such as lug engaging socket 54 provided with fingers which grasp the conventional flanged helicopter floor mounted lug 56. Several varieties are available and a suitable form of fastening means is illustrated in U.S. Pat. No. 2,951,274.

Each journal also embodies a pressure pad 58 and a swivel footed treaded clamp screw 60 which can be adjusted after socket device 54 is secured in place and can be locked by a jam nut 62. This arrangement provides a quickly detachable connection for the entire cluster unit so that it can easily be mounted in place or moved from plane to plane.

In order to secure the cluster beam support arm 12 in a particular angular relationship journal 16 may be provided with a sector plate 64 secured for rotation with arm 12 and having a series of arcuately disposed holes 68. Pin 66 locks the plate to the journal block in its adjusted position.

Details of the cluster lamp assembly are shown in FIG. 3 wherein the lower end of the hollow support tube 26 is shown provided with a stub shaft 70 which closely fits into the open lower end of support tube 26 and is guided thereby in limited up and down movement. To the bottom of stub shaft 70 is secured a circular disc 72 and the disc and shaft are controlled in up and down movement to effect convergence and divergence of the clustered light units in a manner described hereafter.

In the embodiment illustrated the light cluster assembly comprises seven light units arranged with one central light unit 74 surrounded by six similar light units 76—78—80—82—84—86 which latter are preferably located within, and protected by, the peripherally disposed tubular ring framework 50. The outer units are each supported at the point of proximity to the ring member by means of six suitable hinge assemblies 88 including individual light unit brackets 90.

The central light unit 74 may be supported at the center of circular disc 72 by a similar bracket 90 which instead of being hinged is bolted to disc 72 by an extension 92 so that the central light unit moves up and down with the disc 72.

In order to cause the peripherally arranged light units to move in unison so that their beams will converge and diverge from the axis of the cluster they are each linked to the circular disc 72 by short link arms 94, pivotally mounted to clips 96 and 98 as shown.

Various means may be employed to raise and lower the circular disc 72. FIG. 3 shows the use of an actuating lever 100 pivoted to a reinforcing rib 102 by bolt 104 and having an indented area 106 which registers with depressions or holes 108 to retain the lever in its adjusted position. The inner end of lever 100 may be connected to the circular disc 72 by link arm 110 which passes through an opening in reinforcement disc 112 for this purpose.

The wires from each light unit may be bundled into a harness (not shown) which leads to a suitable control box and power source in the helicopter (also not shown).

A modified form of remote control linkage is shown in FIG. 5 where a control cable assembly 114 is illustrated. Such control cable ordinarily includes a flexible wire wound tubular casing surrounding an axially movable wire core 115. At the outer end this core wire 115 may be secured at point 116 to the outer end of lever 100 and at the inner end it is secured for activation by twisting movement of handgrip 20. Such linkage may be similar in nature to the twist grip control commonly used on motorcycles. With this arrangement one hand can control both cluster positioning and light concentration.

It will be apparent that the cluster light assembly is simple, lightweight and easily serviced. Also because of its open construction the intense heat generated by high-intensity light units is readily dissipated.

The bright rays are easily directed and controlled from broad to narrow, front to back and side to side. Also the rugged protective structure prevents damage due to vibration or rough field usage.

Though the present invention has been illustrated and combined as applied to helicopters it will be apparent that the principles employed may equally be applied to other situations.

Obviously many modifications and variations of the present invention are possible in the light of the above teachings. It is therefore to be understood that within the scope of the appended claims the invention may be practiced otherwise than as specifically described.

I claim:

1. A lightweight, weatherproof, cluster light assembly adapted for quick attachment to and removal from a helicopter-type aircraft during field combat operations comprising:
   an elongate cantilever-type tubular support arm;
   quick detachable fittings mounting one end of said arm to the structure of a helicopter type aircraft so that the arm extends laterally from an operator occupied position within the aircraft to a position alongside of an aircraft;
   said fittings including an arm support journal portion to permit rotation of the arm about its longitudinal axis;
   an upright control handle conveniently accessible to an operator within the aircraft and having a clevis joint connection to said arm so that angular movement of the arm in a forward and aft direction of the aircraft rotates said arm about its longitudinal axis;
   a cluster light assembly depending from the outboard end of said arm;
   said assembly being journaled in a clevis-type fitting which permits swinging movement of the cluster in a plane parallel to the support arm and transverse to the fore and aft axes of the aircraft;
   and a control rod connecting the upright control handle to said cluster light assembly; and
   whereby fore and aft movement of said control handle swings the cluster in a fore and aft direction with respect to the aircraft heading and side to side movement of said control handle swings the cluster in a side to side direction with respect to said aircraft heading.

2. The device of claim 1 wherein the light cluster comprises a plurality of independent lighting units arranged in a circle:
   a circular frame member surrounding the circle of independent light units to protect and provide structural support therefor;
   each light unit being pivotally secured to an adjacent portion of the circular frame member and aligned thereby so as to permit movement only in a plane perpendicular to the axis of the framework at the point of pivotal connection;
   support means for the inner edges of each pivotally supported light unit; and
   means for raising and lowering the inner edges of the independent light units in unison to so tilt the units that their separate optical axes are selectively caused to converge or diverge.

3. The device of claim 2 wherein the control handle includes a twist grip connected to the light unit support means so that the axes of the independent light units may be caused to converge or diverge simultaneously with forward and side movement of the lamp cluster.